(12) United States Patent
Park et al.

(10) Patent No.: US 12,229,371 B2
(45) Date of Patent: Feb. 18, 2025

(54) METHOD AND DEVICE FOR DETECTING POSITION OF OBJECT

(71) Applicant: HYUNDAI MOBIS CO., LTD., Seoul (KR)

(72) Inventors: Sung Hyun Park, Hwaseong-si (KR); Jun Seong Seo, Yongin-si (KR); Hee Seung Kim, Seongnam-si (KR); Hyang Sook Kim, Yongin-si (KR); Ji Eun Hwang, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/517,831

(22) Filed: Nov. 22, 2023

(65) Prior Publication Data

US 2024/0319826 A1    Sep. 26, 2024

(30) Foreign Application Priority Data

Mar. 21, 2023  (KR) ........................ 10-2023-0036679

(51) Int. Cl.
*G06F 3/042*    (2006.01)

(52) U.S. Cl.
CPC ................................ *G06F 3/0421* (2013.01)

(58) Field of Classification Search
CPC .................................................... G06F 3/0421
See application file for complete search history.

(56) References Cited

U.S. PATENT DOCUMENTS

| | | | | |
|---|---|---|---|---|
| 2009/0237344 | A1* | 9/2009 | Gui ...................... | G06F 3/03545 345/92 |
| 2009/0237372 | A1* | 9/2009 | Kim ...................... | G06F 3/0482 345/173 |
| 2009/0237375 | A1* | 9/2009 | Khan ...................... | G06F 3/0421 385/33 |
| 2009/0244018 | A1* | 10/2009 | Lin ...................... | G06F 3/0423 345/173 |
| 2018/0217670 | A1* | 8/2018 | Cho ...................... | G06F 3/0446 |
| 2018/0232057 | A1* | 8/2018 | Takada ...................... | G06F 3/016 |

FOREIGN PATENT DOCUMENTS

| | | |
|---|---|---|
| KR | 10-1131365 B1 | 4/2012 |
| KR | 10-2125756 B1 | 6/2020 |

* cited by examiner

*Primary Examiner* — Sejoon Ahn
(74) *Attorney, Agent, or Firm* — MORGAN, LEWIS & BOCKIUS LLP

(57) ABSTRACT

A method and a device for detecting the position of an object are disclosed. According to an embodiment of the present disclosure, the method for detecting the position of an object includes: detecting a position of the object in a sensing zone, which is divided into multiple divided sensing zones along one direction, by causing multiple light-emitting elements disposed along the one direction to emit light sequentially along the one direction and measuring an intensity and a reception time point of a reflected signal by using a light-receiving element; and reflecting and displaying the detected position of the object on a display screen.

10 Claims, 9 Drawing Sheets

METHOD AND DEVICE FOR DETECTING POSITION OF OBJECT

CROSS-REFERENCE TO RELATED APPLICATION(S)

This application is based on and claims priority under U.S.C. 119 to Korean Patent Application No. 10-2023-0036679, filed on Mar. 21, 2023, in the Korean Intellectual Property Office, the disclosure of which is herein incorporated by reference in its entirety.

BACKGROUND OF THE INVENTION

1. Field of the Invention

The present disclosure relates to a position detection device and, more particularly, to a device capable of precisely detecting the position of an object by enlarging the size of a menu selected by the object on a screen.

2. Description of the Prior Art

Optical sensor technology is a technology that tracks direction or coordinates by emitting light through a light emitter and detecting a signal of the reflected light through a light receiver. Recently, a technology has been developed to detect the position of an object by measuring the time it takes for the light to be emitted and reflected back. Applying this technology makes it possible to implement a technique such as popping up a menu in an area to which a user's finger is pointing by measuring the position of the pointing finger at a location adjacent to a display screen.

However, in a typical optical sensor, the emission direction of light from a light emitter is usually a vertical direction from the bottom toward the top of the front of the display. Therefore, it is possible to detect the position of a finger relative to a display screen while the finger is adjacent to the display, but when the finger is slightly moved away from the front of the display screen, detecting the finger itself becomes difficult.

Recently, this optical sensor technology has been used to develop technology that allows remote control of navigation, multimedia systems, air conditioning, etc. located in the center fascia of a vehicle. By utilizing optical sensor technology to control navigation, etc., a driver does not have to make direct finger contact with screens or buttons while driving, and thus can perform manipulation in a more comfortable posture, thereby reducing the risk of traffic accidents.

In the case in which this technology is applied to remotely control devices inside a vehicle, when the size of a menu on a screen is not larger than the size of the hand, the recognition resolution relative to the size of the hand is very small, and the shape of the hand may vary. Thus, errors occur in recognizing the position of the hand in a condition in which the entire hand is required to be sensed.

Also, when a finger is shaking while a menu screen is remotely selected by using the finger, different menus located on the left and right sides may be alternately selected while flickering.

In addition, due to mismatch between the boundary of the menu and the cognitive boundary of a user, there may be instances wherein the user cannot accurately select a desired menu.

Therefore, in this technological field, there is a need for a technology that can accurately recognize the position of a hand and maintain a stable state when a menu is selected.

SUMMARY OF THE INVENTION

A technical aspect of the present disclosure is to provide a method and a device for detecting the position of an object, wherein the position of the object can be accurately recognized.

Another technical aspect of the present disclosure is to provide a method and a device for detecting the position of an object, wherein a sensing zone expansion effect can be applied to maintain stable selection state when a menu is selected.

Another technical aspect of the present disclosure is to provide a method and a device for detecting the position of an object, wherein a stable menu selection state can be visually recognized by increasing the size of a selected menu.

In order to realize the above aspects, a position detection method according to an embodiment of the present disclosure includes detecting a position of an object in a sensing zone, which is divided into multiple divided sensing zones along one direction, by causing multiple light-emitting elements disposed along the one direction to emit light sequentially along the one direction and measuring an intensity and a reception time point of a reflected signal by using a light-receiving element; and reflecting and displaying the detected position of the object on a display screen.

The position detection method may further include increasing a size of a divided sensing zone corresponding to the detected position of the object in the sensing zone which is divided into the multiple divided sensing zones.

In the increasing of the size of the divided sensing zone corresponding to the detected position of the object in the sensing zone which is divided into the multiple divided sensing zones, a width of the divided sensing zone corresponding to the detected position of the object along the one direction may be increased by a predetermined ratio.

In the increasing of the size of the divided sensing zone corresponding to the detected position of the object in the sensing zone which is divided into the multiple divided sensing zones, widths along the one direction of left and right zones tangent to the divided sensing zone corresponding to the detected position of the object may be reduced by an amount by which the size of the divided sensing zone corresponding to the detected position of the object is increased.

In the increasing of the size of the divided sensing zone corresponding to the detected position of the object in the sensing zone which is divided into the multiple divided sensing zones, sensitivity with which a result of the detection of the position of the object is reflected on the display screen may be configured to be reduced by a ratio of an increased size of the divided sensing zone to a size of the divided sensing zone before the divided sensing zone is enlarged.

According to an embodiment of the present disclosure, a position detection device includes a display unit configured to display information on a screen, a sensor unit configured to detect a position of an object in a sensing zone, which is divided into multiple divided sensing zones along one direction, by causing multiple light-emitting elements disposed along the one direction to emit light sequentially along the one direction and measuring an intensity and a reception time point of a reflected signal by using a light-receiving element, and a processor configured to reflect and display the detected position of the object on the screen of the display unit.

The processor may be configured to increase a size of a divided sensing zone corresponding to the detected position of the object in the sensing zone which is divided into the multiple divided sensing zones.

The processor may be configured to increase a width of the divided sensing zone corresponding to the detected position of the object along the one direction by a predetermined ratio.

The processor may be configured to reduce widths along the one direction of left and right zones, tangent to the divided sensing zone corresponding to the detected position of the object, by an increase in the size of the divided sensing zone corresponding to the detected position of the object.

The processor may be configured to reduce sensitivity, with which the display screen reflects a result of the detection of the position of the object, by a ratio of an increased size of the divided sensing zone to a size of the divided sensing zone before the divided sensing zone is enlarged.

According to the various embodiments of the present disclosure as described above, the position of an object may be accurately recognized.

Furthermore, by applying a sensing zone enlargement effect, a stable selection state may be maintained when a menu is selected.

Furthermore, a stable menu selection state may be visually recognized by increasing the size of a selected menu.

Advantageous effects obtainable from the present disclosure may not be limited to the above-mentioned effects, and other effects which are not mentioned may be clearly understood, through the following descriptions, by those skilled in the art to which the present disclosure pertains.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
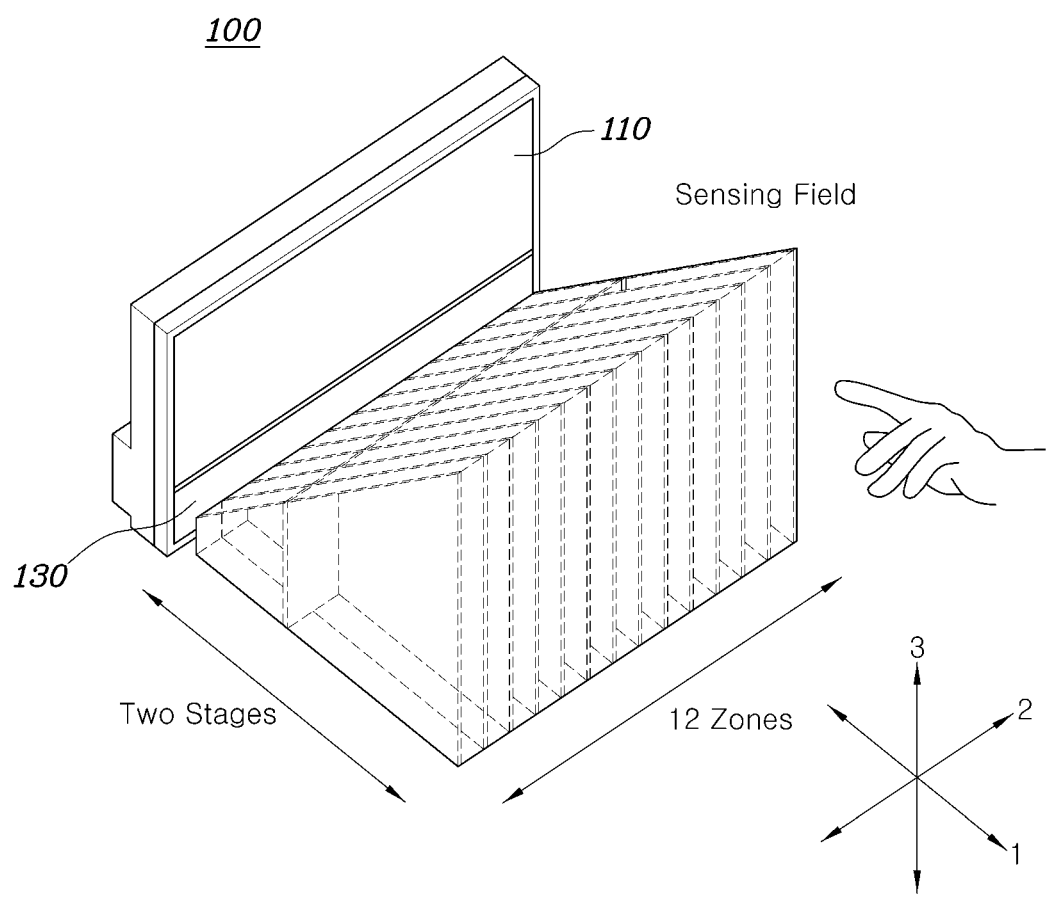
FIG. 1 illustrates a position detection device according to an embodiment of the present disclosure.

Hereinafter, embodiments disclosed in the present specification will be described in detail with reference to the accompanying drawings, and the same or similar elements are given the same and similar reference numerals, so duplicate descriptions thereof will be omitted. The terms "module" and "unit" used for the elements in the following description are given or interchangeably used in consideration of only the ease of writing the specification, and do not have distinct meanings or roles by themselves. Furthermore, in describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

FIG. 1 illustrates a position detection device according to an embodiment of the present disclosure.

Referring to FIG. 1, a position detection device 100 according to the present embodiment may include a display unit 110 and a sensor unit 130.

The display unit 110 displays information on a screen.

For example, the display unit 110 may have a rectangular display area which has a major-axis direction, extending in the direction of one axis (herein referred to as a second axis), and a minor-axis direction, extending in the direction of the other axis (herein, referred to as a third axis) intersecting the one axis. However, this is exemplary and the present disclosure is not necessarily limited thereto. For example, the shape of the display area may be polygonal, circular, or elliptical rather than rectangular, the major-axis direction and the minor-axis direction may be opposite to each other, or the display area may have a square shape with no distinction between major and minor axes.

Furthermore, the display unit 110 may be a display screen of an audio, video, and navigation (AVN) system disposed between a driver's seat and a passenger seat of a vehicle. For example, the display unit 110 may display a multimedia playback screen, a navigation screen for providing a route a driver in the vehicle, a user interface for configuring various functions of the vehicle, etc.

Furthermore, the display unit 110 may implement a touch screen by forming a layer structure with a touch sensor or by being formed integrally with the touch sensor. Such a touch screen may function as a user input unit for providing an input interface for a user, and may also provide an output interface for the user.

The display unit 110 may include at least one among a liquid crystal display (LCD), a thin film transistor-liquid crystal display (TFT LCD), an organic light-emitting diode (OLED), a flexible display, a three-dimensional display (3D display), and an e-ink display. These are exemplary, and the present disclosure is not necessarily limited thereto.

The sensor unit 130 extends along one direction in which the display unit 110 extends (here, a second axis direction) and is disposed parallel to the display unit 110 so as to detect the presence, position, movement, etc. of an object approaching the display unit 110. The sensor unit 130 may also be referred to as a "linear sensor" on the basis of the shape thereof.

The linear sensor 130 includes at least one light-emitting means disposed linearly and multiple light-receiving means disposed linearly.

When an object, such as a finger (hereinafter, for convenience of description, an object to be detected is assumed to be a finger), approaches the display unit 110 located at the upper side, the linear sensor 130 may detect the finger approaching the display unit 110 by using the principle that light (such as infrared light) emitted by the light-emitting means is reflected by the finger and detected by the light-receiving means. Specific arrangement of the light-emitting means and the light-receiving means will be described later with reference to FIGS. 5 and 6.

The linear sensor 130 may be arranged to be separated from and spaced apart from the display unit 110, may be arranged to be in contact with the bottom of the display unit 110 as shown in FIG. 1, or may be integrated with the display unit 110, wherein the linear sensor 130 is embedded in the display unit 110, for example, is embedded, in a hidden type, in the rear surface of a cover glass covering the screen of the display unit 110.

The light-emitting means may be disposed such that a sensing zone (i.e., a sensing field) of the linear sensor 130 is formed in a predetermined zone in front of the screen of the display unit 110. That is, the light-emitting means may be disposed such that a light-emitting direction includes at least a first axis direction. Furthermore, when the light emission pattern of the light-emitting means is a fan-shaped spreading pattern, the sensing field may extend along a third axis direction as the distance from the screen of the display unit 110 increases in the forward direction from the screen of the display unit 110. Furthermore, the sensing field may be divided into multiple levels according to a range of a distance away from the screen of the display unit 110 in the forward direction from the screen of the display unit 110, i.e., in the first direction, and may be divided into multiple divided sensing zones in one extension direction (herein, referred to as the second axis direction) of the display unit 110. For example, the sensing field may be divided into two levels in the first axis direction and 12 zones in the second axis direction. However, this is exemplary and the present disclosure is not necessarily limited thereto. Furthermore, the size of the sensing field may be variously configured depending on the intensity of light emitted from the light-emitting means, the angle of irradiation when emitting, the light reception sensitivity of the light-receiving means, the arrangement pattern or the number of the light-emitting means and the light-receiving means, and the like.

Unlike a typical position detection device in which a sensing field is arranged in a perpendicular direction to the display screen, in the position detection device 100 according to the embodiment, the sensing field of the linear sensor 130, as described above, extends as the distance from the screen of the display unit 110 increases in the forward direction from the screen of the display unit 110. Therefore, the position detection device 100 may detect not only a finger adjacent to the display unit 110, but also a finger approaching from a relatively far distance in front of the display unit 110.

Figure 2:
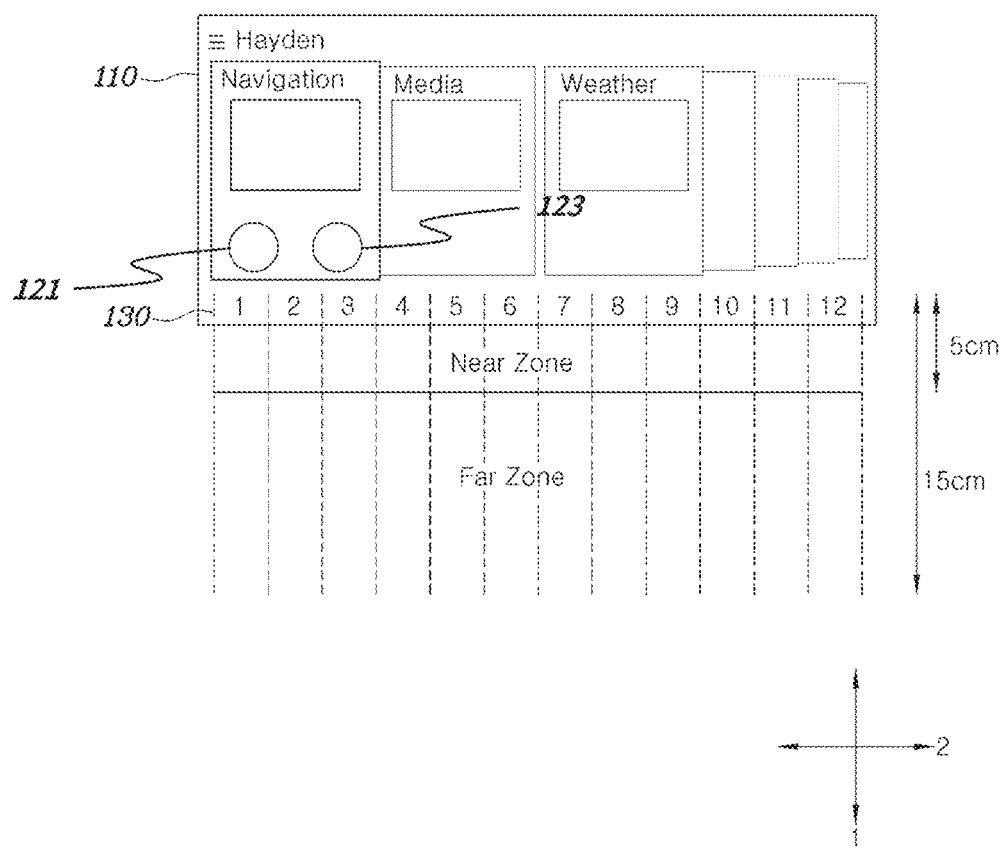
FIG. 2 illustrates an example of a sensing zone of a display unit of the position detection device in FIG. 1.

FIG. 2 illustrates an example of a sensing zone of a display unit of the position detection device in FIG. 1.

Referring to FIG. 2, the sensing zone of the linear sensor 130 may include 12 zones in a second axis direction. As described above, the number of sensing zones may vary depending on the configuration of the light-emitting means and the light-receiving means constituting the linear sensor 130.

The position detection device 100 may detect which zone a finger in proximity to the display unit 110 belongs to, and may provide or modify a user interface (e.g., pop-up of a detailed menu, display of information, etc.) through the display unit 110 in response to the detected zone. For example, as illustrated in FIG. 2, the sensing zone may include 12 zones, numbered 1 to 12, from left to right along the second axis direction. Here, the position detection device 100 may execute (or enlarge/activate/pop up, etc.) a navigation menu 121, 123 when the finger is in zones 1 to 3, may execute a media menu when the finger is in zones 4 to 6, and may execute a weather menu when the finger is in zones 7 to 9.

Furthermore, the position detection device 100 may measure the degree of proximity of the finger to the linear sensor 130, based on the intensity of received light. For example, the degree of proximity of the finger may be classified into two levels, for example, a near zone if the finger is within 5 cm from the linear sensor 130, and a far zone if the finger is between 5 cm and less than 15 cm from the linear sensor 130. In this case, the position detection device 100 may be configured to perform different operations depending on whether the finger is in the near zone and in the far zone. For example, the position detection device 100 may be configured to highlight a selected menu on a display screen by providing a visual effect, such as enlargement/color change, when the finger is in the far zone, and to execute a selected menu when the finger is in the near zone.

Furthermore, although not illustrated, the position detection device 100 may change the arrangement state of menus based on a zone in which the finger is first detected. For example, when the finger is first detected in zone 1, the menus may be presented in a left-biased manner, and when the finger is first detected in zone 12, the menus may be presented in a right-biased manner.

According to an embodiment of the present disclosure, the sensing zone of the linear sensor 130 in the position detection device 100 may be configured to expand in size according to a zone in which an object located in front of the screen of the display unit 110 is detected. In this case, when the object is positioned in one of 12 zones into which the sensing field is divided along the second axis direction, the left/right width of the left of the zone may be increased by a predetermined ratio, and the width of zones adjacent to the zone, that is, left and right zones tangent to the zone, may be reduced by the amount by which the width of the zone is increased.

That is, the left/right width of a zone in which an object is detected is increased by a predetermined ratio, and the sensitivity with which the object position detection result is reflected on the screen of the display unit 110 may be configured to be reduced by the ratio of the increased size of the divided sensing zone to the size of the divided sensing zone before the divided sensing zone is enlarged.

Figure 3:
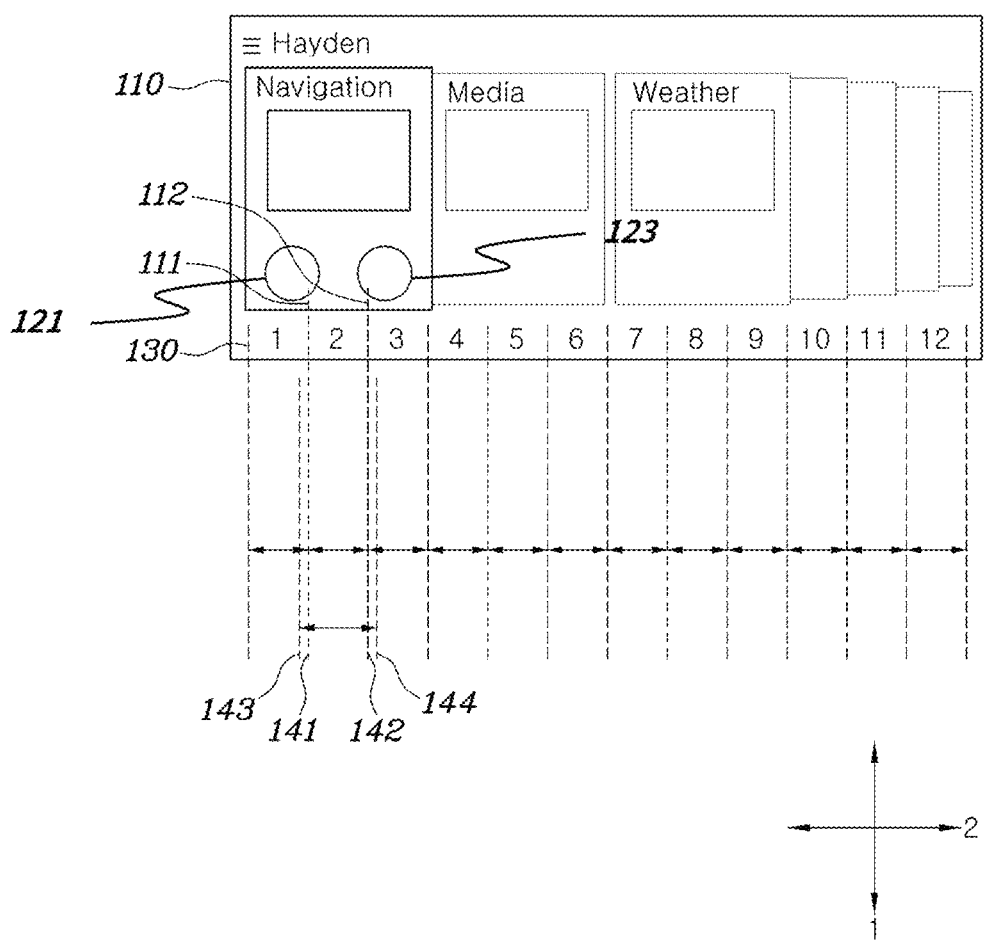
FIG. 3 exemplarily illustrates that a portion of a sensing zone, in which an object is located, in the display unit according to the embodiment of FIG. 2, may be enlarged.

For example, referring to FIG. 3, before the sensing zone is configured to be enlarged, when an object has been positioned in a position 141 which is the left end of zone 2, the position of the object has been reflected and displayed 121, 123 as menu information display, a popup, or the like in the position 11*l* on the screen of the display unit 110. Also, when an object was positioned in a position 142 which is the right end of area 2, the position of the object has been reflected and displayed as menu information display, a popup, or the like in the position 112 on the screen of the display unit 110.

However, when the sensing area has been configured to be enlarged, zone 2 may be enlarged and reflected into a zone between positions 143 and 144. That is, a sensing zone corresponding to a space between a position 111 and a position 112 on the screen of the display unit 110 is enlarged between the positions 143 and 144, so that the sensitivity of the screen of the display unit 110 to an object position-based reflection is reduced. Therefore, a user can more accurately select a desired menu because the sensitivity of the screen to a finger position-based reflection is reduced.

Figure 4:
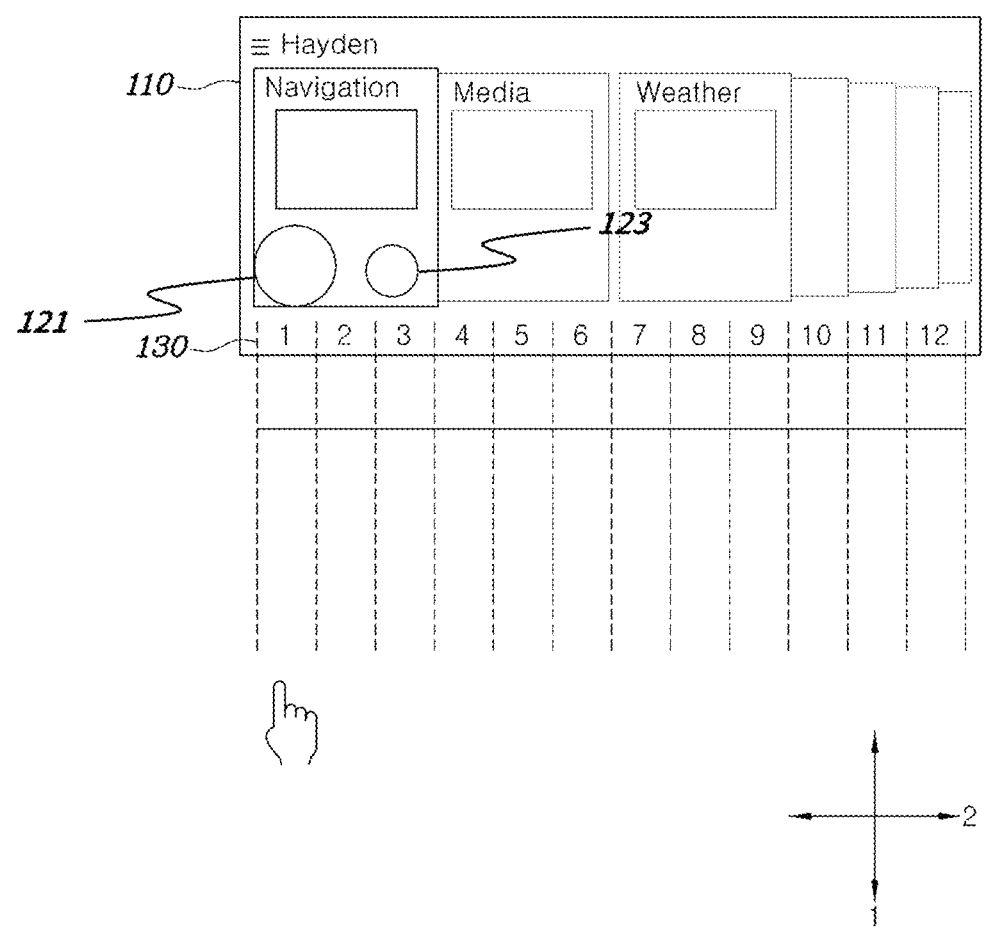
FIG. 4 exemplarily illustrates that the size of a menu selected on the display unit according to the embodiment of FIG. 2 may be increased.

FIG. 4 exemplarily illustrates that the size of a menu icon selected on the display unit according to the embodiment of FIG. 2 may be increased.

The position detection device 100 may detect a position of a finger and reflect the detected position on a menu icon 121, 123.

In this case, the position detection device 100 may increase the size of a menu icon 121, 123 corresponding to the detected position.

For example, referring to FIG. 4, the position detection device 100 may increase the size of a left icon 121 in a navigation menu when a finger is detected in zone 1.

In this case, the size of the icon 121 may be increased by a predetermined ratio.

Furthermore, although not illustrated, when the finger moves from zone 1 to zone 3, the position detection device 100 may return the size of the left icon 121 in the navigation menu to the original state and increase the size of a right icon 123 in the navigation menu by a predetermined ratio.

Figure 5:
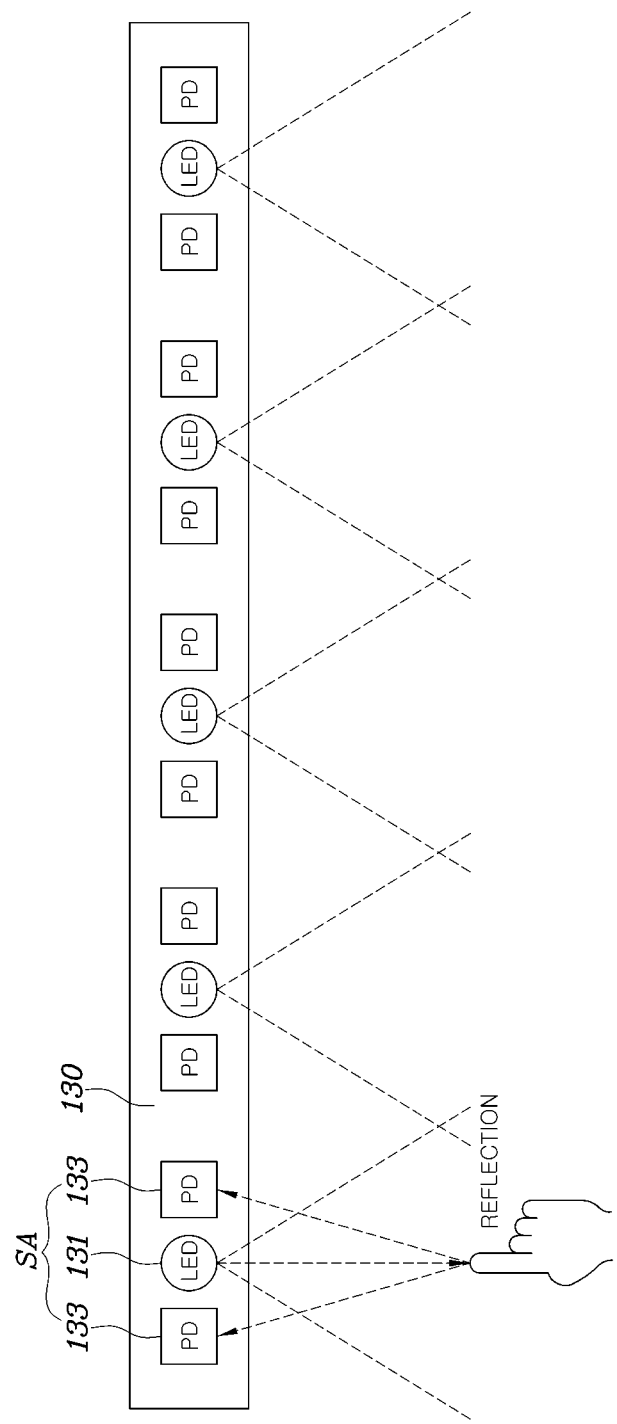
FIG. 5 illustrates a linear sensor module according to an embodiment of the present disclosure.

FIG. 5 illustrates a linear sensor module according to an embodiment of the present disclosure.

Referring to FIG. 5, the linear sensor module 130 according to the present disclosure may have a form in which sensor arrays (SAs), each of which includes a light-emitting element 131 and light-receiving elements 133, are spaced apart from each other at predetermined intervals along one direction. For example, as illustrated in FIG. 4, the sensor arrays (SAs) may each have an array pattern in which the light-emitting element 131 is disposed in the center and the light-receiving elements 133 are each disposed on both sides of the light-emitting element 131. However, this is exemplary and the present disclosure is not necessarily limited thereto.

The light-emitting element 131 may emit light, and the light-receiving elements 133 may detect the light emitted by the light-emitting element 131 when the light is reflected from an object and incident on the light-receiving elements 133. To this end, the light-emitting element 131 may include a light-emitting diode (LED), and the light-receiving elements 133 may each include photodiodes (PD). The light-emitting element 131 may be an IR LED that emits infrared light. When the light-emitting element 131 is an IR LED, it is possible to prevent a user from feeling visual discomfort when the user looks at the display unit 110, especially considering the formation direction and shape of a sensing field.

The position detection device 100 may operate the light-emitting elements 131 included in the sensor arrays (SAs) continuously and simultaneously, or may operate only some (e.g., one) of the light-emitting elements 131 at a moment by using a time-sharing method. Using the time-sharing method may reduce power consumption for sensing, and may reduce the phenomenon of light interference caused by simultaneous light emission of adjacent light-emitting elements 131.

The number of sensor arrays (SAs) may be the same as or different from the number of sensing zones. For example, when a sensing field is divided into 12 zones along a second axis direction, 12 sensor arrays (SAs) may be used such that one sensor array (SA) corresponds to one zone. In another example, as shown in FIG. 5, each sensor array (SA) may be configured to have a light emission zone overlapping at least partially with the light emission zone of an adjacent sensor array (SA), while using fewer sensor arrays (SAs) than the zones of the sensing field. In this case, the sensing zone may be provided with a greater number of zones than the sensor arrays (SAs) by comprehensively determining the relative intensity of light detected by the light-receiving elements 133 of each of multiple sensor arrays (SAs).

Figure 6:
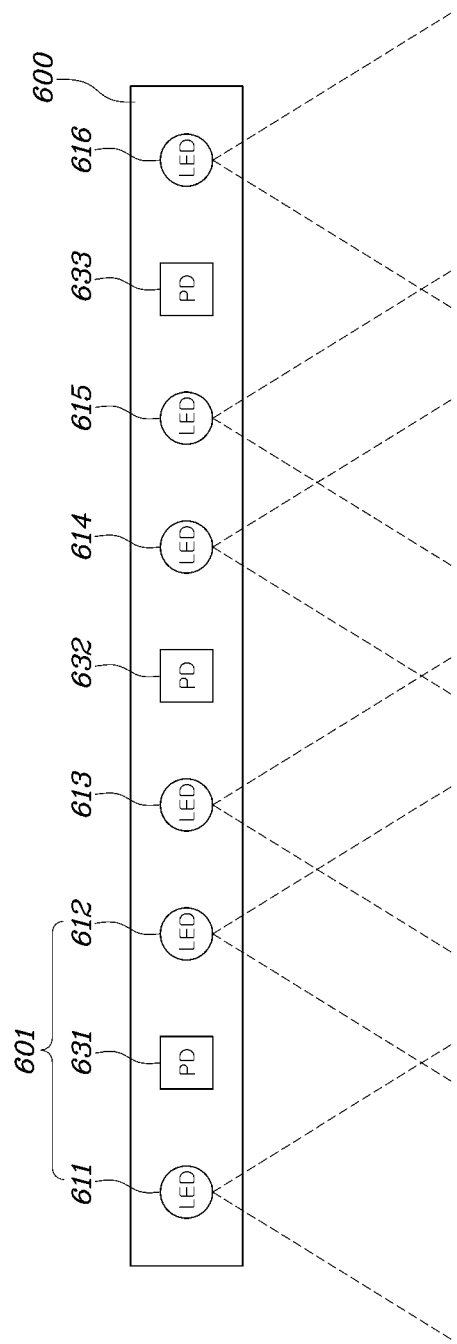
FIG. 6 illustrates a linear sensor module according to another embodiment of the present disclosure.

FIG. 6 illustrates a linear sensor module according to another embodiment of the present disclosure.

Referring to FIG. 6, a linear sensor module 600 according to the present embodiment may include multiple light-emitting elements and multiple light-receiving elements. For example, the multiple light-emitting elements may include first to sixth light-emitting elements 611, 612, 613, 614, 615, and 616, and the multiple light-receiving elements may include first to third light receiving elements 631, 632, and 633.

Furthermore, a first sensor array 601 may have an array pattern in which a first light-receiving element 631 is disposed in the center and first and second light-emitting elements 611 and 612 are each disposed on both sides of the first light-receiving element 631. However, this is exemplary and the present disclosure is not necessarily limited thereto.

The position detection device 100 may apply a time-sequential LED light emission technique to operate only some (e.g., one) of the light emitting elements 611, 612, 613, 614, 615, 616 at a moment.

In this case, the light-emitting elements may be made to emit light sequentially so that only one light-emitting element emits light at a time, or one light-emitting element may be made to emit light before another light-emitting element is turned off after emitting light, so that multiple light-emitting elements, e.g., two light-emitting elements, emit light simultaneously.

By applying the time-sequential LED light emission technique, power consumption for sensing may be reduced, and light interference caused by simultaneous light emission of adjacent light-emitting elements may be reduced. Furthermore, compared with when the multiple light-emitting elements 611, 612, 613, 614, 615, and 616 are operated continuously and simultaneously, a smaller number of light-receiving elements 631, 632, and 633 may be used, thereby reducing costs.

Figure 7:
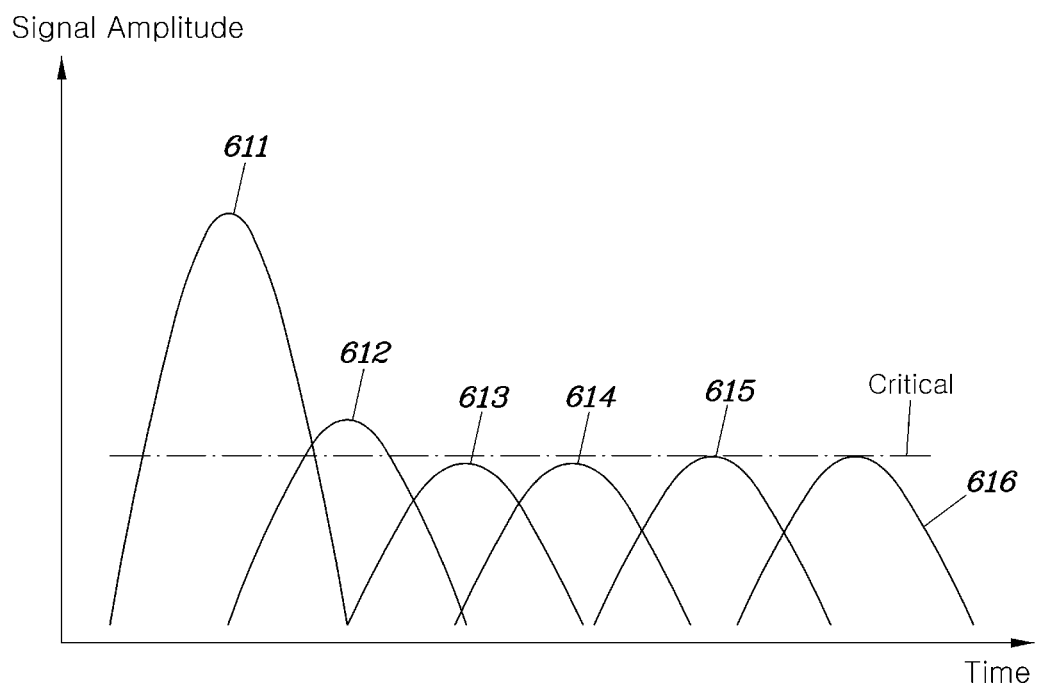
FIG. 7 exemplarily illustrates a signal intensity that may be measured by a light-receiving element when light-emitting elements are sequentially turned on in the linear sensor module of FIG. 6.

FIG. 7 exemplarily illustrates signal intensities that may be measured by the first light-receiving element 631 when the first to sixth light-emitting elements 611, 612, 613, 614, 615, and 616 are sequentially turned on in the linear sensor module of FIG. 6. In this case, only when a measured signal intensity is equal to or greater than a threshold, the first light-receiving element may sense a corresponding light-emitting element. For example, signal intensities equal to or greater than the threshold may be measured only when the first and second light-emitting elements 611 and 612, among the first to sixth light-emitting elements 611, 612, 613, 614, 615, 616, emit light. Referring to FIG. 7, since the intensity of a signal emitted from the first light-emitting element 611 and reflected by an object is greater than the intensity of a signal emitted from the second light-emitting element 612 and reflected by the object, the object may be determined to be present in a zone corresponding to the first light-emitting element 611.

Figure 8:
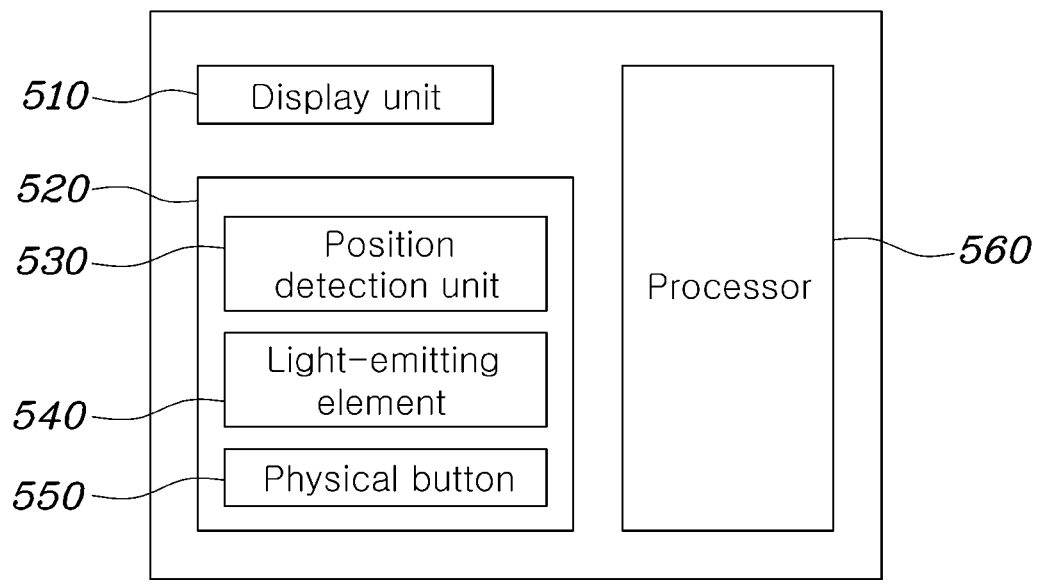
FIG. 8 is a block diagram illustrating a configuration of a position detection device according to an embodiment of the present disclosure.

FIG. 8 is a block diagram illustrating a configuration of a position detection device 100 according to an embodiment of the present disclosure.

Referring to FIG. 8, a position detection device 500 according to the present embodiment may include a display unit 510, a linear sensor 520, and a processor 560. FIG. 8 mainly illustrates elements related to embodiments of the present disclosure, and the position detection device 500 may include more elements than the illustrated elements.

The configuration and function of the display unit 510 and the linear sensor 520 are as described above. Therefore, a redundant description will be omitted, and the function of the processor 560 will be described below.

In particular, the processor 560 may receive a light detection signal of a light-receiving element from the linear sensor 130d, may determine, based on the light detection signal, whether a finger is detected in a zone/area of a sensing field, and control the display unit 510 based on the determination. For example, the processor 560 may detect which zone/area of the sensing field a finger approaching the display unit 110 belongs to, and may pop up a corresponding detailed menu or display corresponding information.

In addition to the above-described operation related to detecting objects within the sensing field, the processor 560 may generally control the overall operation of the position detection device 500. For example, the processor 560 may process signals, data, information, etc. input or output from the above-described elements, or may drive application programs stored in a memory (not shown), thereby providing or processing appropriate information or functions for a user.

Furthermore, the processor 560 may control at least some of the above-described elements to drive an application program stored in the memory. Furthermore, the processor 560 may operate two or more of the elements included in the position detection device 500 in combination with each other to drive the application. According to an exemplary embodiment of the present disclosure, the processor 560 is configured as a hardware (e.g., computer, microprocessor, CPU, ASIC, circuitry, logic circuits, etc.) and is coupled with an associated non-transitory memory storing software instructions which, when executed by the processor 560, provides the functionalities as described above. Herein, the memory and the processor 201 may be implemented as separate semiconductor circuits. Alternatively, the memory and the processor 560 may be implemented as a single integrated semiconductor circuit. The processor 560 may embody one or more processor(s).

Figure 9:
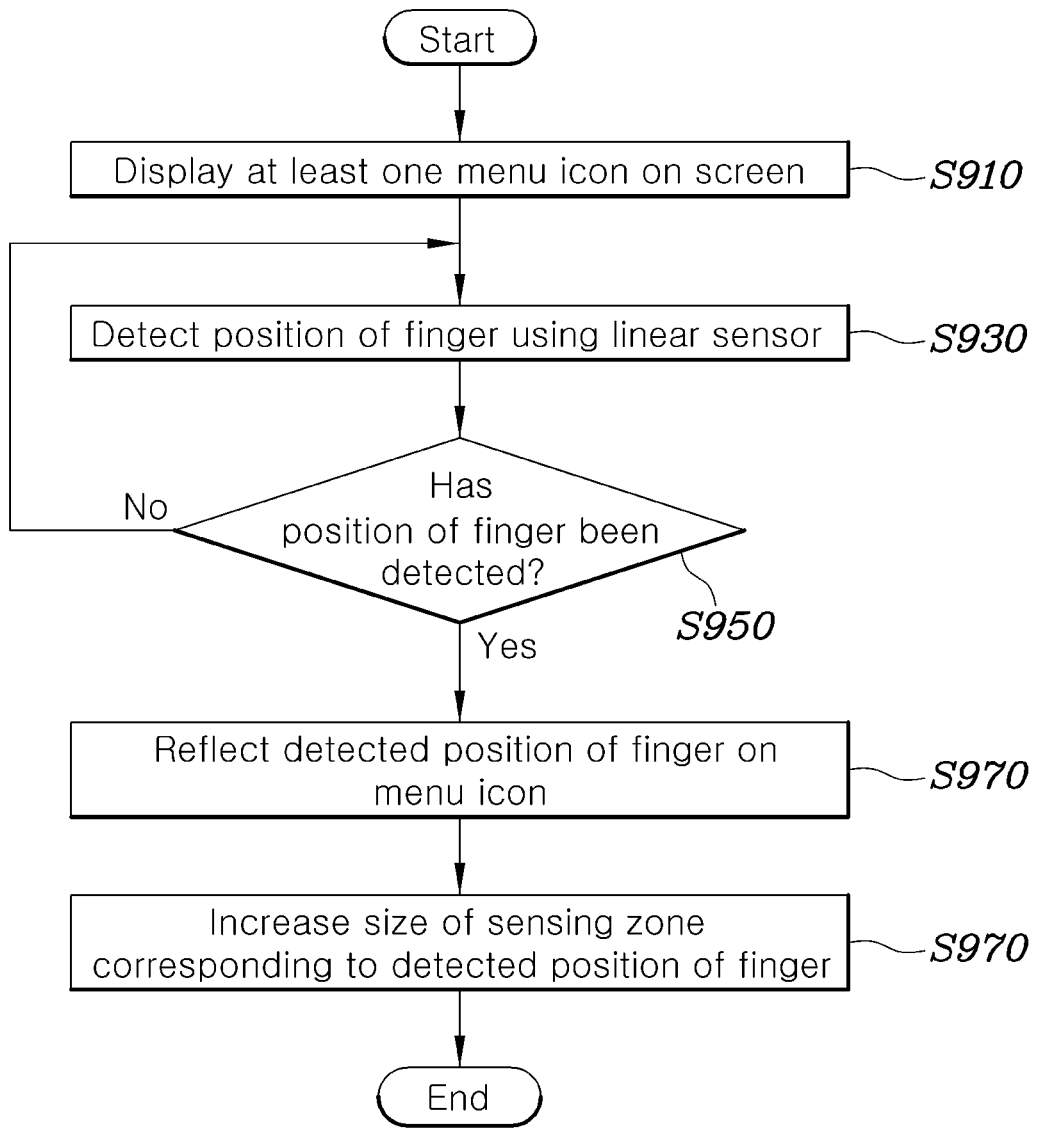
FIG. 9 illustrates a method for recognizing the position of a finger by a position detection device according to an embodiment of the present disclosure.

FIG. 9 illustrates a method for recognizing the position of a finger by a position detection device according to an embodiment of the present disclosure.

FIG. 9 illustrates a method for recognizing the position of a finger by the position detection device 500 according to an embodiment of the present disclosure. The operations in FIG. 9 may be performed by the processor 560 of the position detection device 500.

Referring to FIG. 9, the position detection device 500 displays at least one menu icon on a display screen (S910). For example, the position detection device 500 may display multiple menu icons on the screen of the display unit 510, as in FIG. 2.

Furthermore, the position detection device 500 detects the position of a finger by using a linear sensor (S930).

At this time, the position detection device 500 may detect the position of the finger by causing multiple light-emitting elements to subsequentially emit light and measuring the intensity and reception time point of a signal by using a light-receiving element.

Furthermore, the position detection device 500 determines whether the position of the finger has been detected (S950), and reflects the detected position of the finger in a menu icon when the position of the finger has been detected (S970).

At this time, the position detection device 500 may increase the size of a menu icon corresponding to the position of the finger on the screen of the display unit 510, thereby reflecting the detected position of the finger in the menu icon.

Furthermore, the position detection device 500 increases the size of a divided sensing zone corresponding to the detected position of the finger (S990).

When an object is positioned in one of 12 zones into which a sensing field is divided along a second axis direction, the left/right width of the zone may be increased by a predetermined ratio, and the widths of zones adjacent to the zone, i.e., left and right zones tangent to the zone, are reduced by the amount by which the width of the zone is increased.

That is, the left/right width of the zone in which the object has been detected may be increased by the predetermined ratio, and sensitivity with which the object position detection result is reflected on the screen of the display unit 510 may be configured to be reduced by the ratio of the increased size of the divided sensing zone to the size thereof before the divided sensing zone is enlarged.

According to the embodiments of the present disclosure described so far, the position of an object may be accurately recognized.

Furthermore, by applying a sensing area expansion effect, a stable selection state may be maintained when a menu is selected.

Furthermore, the size of the selection menu may be increased to visually recognize a stable menu selection state.

The present disclosure as described above may be implemented as codes in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. Further, the above detailed description should not be construed in a limitative sense, but should be considered in an illustrative sense in all aspects. The scope of the present disclosure should not be determined by reasonable interpretation of the appended claims, and all changes and modifications within the equivalent scope of the present disclosure fall within the scope of the present disclosure.

What is claimed is:

1. A method for detecting a position of an object by a position detection device, the method comprising:
    detecting a position of the object in a sensing zone, which is formed in a predetermined zone in front of a display screen and is divided into multiple divided sensing zones along a first direction, by causing multiple light-emitting elements disposed along the first direction to emit light sequentially along the first direction and measuring an intensity and a reception time point of a reflected signal by using a light-receiving element;
    increasing a size of at least one of the multiple divided sensing zones that corresponds to the detected position of the object; and
    reflecting and displaying the detected position of the object on the display screen based on the increased size of at least one of the multiple divided sensing zones.

2. The method of claim 1, wherein the sensing zone is further divided into one or more levels according to a range of a distance away from the display screen in a second direction, the second direction is perpendicular to the first direction.

3. The method of claim 2, wherein in the increasing of the size of the at least one of the multiple divided sensing zones corresponding to the detected position of the object, a width of the at least one of the multiple divided sensing zones corresponding to the detected position of the object along the first direction is increased by a predetermined ratio.

4. The method of claim 3, wherein in the increasing of the size of the at least one of the multiple divided sensing zones corresponding to the detected position of the object widths along the first direction of left and right zones adjacent to the at least one of the multiple divided sensing zones are reduced by the same amount that the size of the at least one of the multiple divided sensing zones increases.

5. The method of claim 2, wherein in the increasing of the size of the at least one of the multiple divided sensing zones corresponding to the detected position of the object, sensitivity with which a result of the detection of the position of the object is reflected on the display screen is configured to be reduced by a ratio of an increased size of the at least one of the multiple divided sensing zones to a size of the at least one of the multiple divided sensing zones before the at least one of the multiple divided sensing zones is increased.

6. A position detection device comprising:
    a display unit configured to display information on a screen;
    a sensor configured to detect a position of an object in a sensing zone, which is formed in a predetermined zone in front of the screen and is divided into multiple divided sensing zones along a first direction, by causing multiple light-emitting elements disposed along the first direction to emit light sequentially along the first direction and measuring an intensity and a reception time point of a reflected signal by using a light-receiving element; and
    a processor configured to increase a size of at least one of the multiple divided sensing zones that corresponds to the detected position of the object, reflect and display the detected position of the object on the screen of the display unit based on the increased size of at least one of the multiple divided sensing zones.

7. The position detection device of claim 6, wherein the sensing zone is further divided into one or more levels according to a range of a distance away from the display screen in a second direction, the second direction is perpendicular to the first direction.

8. The position detection device of claim 7, wherein processor is configured to increase a width of the at least one of the multiple divided sensing zones along the first direction of the sensing zone, corresponding to the detected position of the object, by a predetermined ratio.

9. The position detection device of claim 8, wherein the the processor is configured to reduce widths along the first direction of left and right zones adjacent to the at least one of the multiple divided sensing zones by the same amount that the size of the at least one of the multiple divided sensing zones increases.

10. The position detection device of claim 7, wherein the processor is configured to reduce sensitivity, with which a result of the detection of the position of the object is reflected on the display screen, by a ratio of an increased size of the at least one of the multiple divided sensing zones to a size of the at least one of the multiple divided sensing zones before the at least one of the multiple divided sensing zones is increased.

* * * * *